(12) United States Patent
Moslehi et al.

(10) Patent No.: US 7,127,132 B1
(45) Date of Patent: Oct. 24, 2006

(54) CASCADE FIBER-OPTIC GRATING-BASED SENSOR APPARATUS AND METHOD

(75) Inventors: Behzad Moslehi, Mountain View, CA (US); Kelvin K. Chau, Pleasanton, CA (US)

(73) Assignee: IFOS, Inc., Santa Clara, CA (US)

( * ) Notice: Subject to any disclaimer, the term of this patent is extended or adjusted under 35 U.S.C. 154(b) by 113 days.

(21) Appl. No.: 10/795,693

(22) Filed: Mar. 8, 2004

(51) Int. Cl.
*G02B 6/00* (2006.01)

(52) U.S. Cl. .............................. 385/12; 385/15; 385/31; 385/37

(58) Field of Classification Search ................. 385/12, 385/15, 31, 37
See application file for complete search history.

(56) References Cited

U.S. PATENT DOCUMENTS

| | | |
|---|---|---|
| 4,367,040 A | 1/1983 | Goto |
| 4,697,926 A | 10/1987 | Youngquist et al. |
| 4,699,513 A | 10/1987 | Brooks et al. |
| 4,761,073 A | 8/1988 | Meltz et al. |
| 4,770,535 A | 9/1988 | Kim et al. |
| 4,806,012 A | 2/1989 | Meltz |
| 4,996,419 A | 2/1991 | Morey |
| 5,028,801 A | 7/1991 | Gerdt |
| 5,144,690 A * | 9/1992 | Domash ............... 385/12 |
| 5,394,488 A | 2/1995 | Fernald et al. |
| 5,399,854 A | 3/1995 | Dunphy et al. |
| 5,467,942 A | 11/1995 | Abbas et al. |
| 5,513,913 A | 5/1996 | Ball et al. |
| 5,557,400 A | 9/1996 | Sorin et al. |
| 5,754,293 A * | 5/1998 | Farhadiroushan ........ 356/478 |
| 6,204,920 B1 | 3/2001 | Ellerbrock et al. |

* cited by examiner

*Primary Examiner*—Jennifer Doan
(74) *Attorney, Agent, or Firm*—Jay A. Chesavage; File-EE-Patents.com

(57) ABSTRACT

A fiber optic sensor system includes a plurality m of sensor segments, each sensor segment further comprising a plurality n of sensor gratings for making measurements. Each sensor grating of the sensor segment operates within a unique wavelength channel, such that a plurality m of sensor segments have m sensors in each wavelength channel, and n wavelength channels, for a total of m*n sensors. A broadband optical source is gated for a duration of time which enables all of the sensors on a sensor segment to reflect optical energy corresponding to their measurement, but not long enough to receive reflected optical energy from more than one sensor on a single wavelenghth channel. In this manner, n wavelength channels of measurement can be time-multiplexed to measure m*n sensors.

38 Claims, 7 Drawing Sheets

Sensor Gratings

US 7,127,132 B1

CASCADE FIBER-OPTIC GRATING-BASED SENSOR APPARATUS AND METHOD

FIELD OF THE INVENTION

The present invention is directed to the class of sensors for which multiple measurements can be made using a single strand of fiber having a plurality of sensors fabricated therein. The sensors of the present invention are formed from Fiber Bragg Gratings (FBG), and the sensors may be used to measure any physical phenomenon which can be translated into a change in grating pitch or wavelength reflection response of the Fiber Bragg Gratings. Typical grating sensor applications include the measurement of temperature through the change in either the index of refraction of the optical fiber or the physical change in dimension of the fiber, or the measurement of strain by applying a fraction of the strain to the grating of the optical fiber, or any other physical phenomenon which results in the change in reflectance wavelength of a Bragg grating sensor.

BACKGROUND OF THE INVENTION

FIG. 1 shows a measurement system 100 attached to a fiber 102 comprising a plurality of gratings 104, 106, and 108. A broadband source 126 is applied via fiber 128 to splitter 130, which sends optical energy to sensor array 102, which is a single fiber having gratings 104, 106, through 108 present. There may be an arbitrary number of such gratings, and each grating responds to a unique wavelength $\lambda_1$, $\lambda_2$, through $\lambda_n$. The gratings 104, 106, through 108 return optical energy at a center wavelength specific to each grating, and these reflected optical signals are removed in splitter 130 to wavelength measurement device 132, which may be any system for discriminating a plurality of wavelengths. In the wavelength measurement system 132, the incoming wave is sent to a wavelength separator 236, which performs coarse separation of wavelength, and this is followed by wavelength discriminators 138, 146, 154, which have a sine characteristic for a given wavelength, splitting the output between detector 1 134 and detector 1' 136 to controller 120 analog complementary inputs 160 and 162. This same system of complementary wavelength discriminators is used for each incoming wavelength channel, comprising discriminators 146 for channel 2 complementary detectors 142 and 144 coupled to controller inputs 164 and 166, and for channel n, wavelength discriminator 154 coupled to complementary detectors 150 and 152 driving controller inputs 168 and 170. For each grating wavelength, there is a corresponding input detector pair which uses power ratio to determine wavelength.

FIG. 2 shows the broadband source 126 of FIG. 1 controlled by a signal 180 causing the broadband source 126 of FIG. 1 to be commutated on and off. Each of the detector pairs responding to a sensor grating reflecting optical power at a wavelength produces an output and a complementary output, shown as signals 182 and 184 which may be the signal outputs of exemplar detectors 134 and 136, or any of the other detector pairs. These signals are summed in signal 188 and subtracted from each other in signal 186. The ratio of the sum and difference signal may be used to form a computation shown as signal 190 which may be applied to a lookup table, or any mathematical relationship which can be used to determine the wavelength of the reflected optical energy. In this manner, a plurality of optical sensors return a plurality of unique wavelengths which are applied to a particular set of detectors, the output being resolved by measurement device 132 of FIG. 1 by using power ratios, or any other suitable means for wavelength detection. During the time the optical source is off, the offsets are determined, and when it is on, the detector pair for each wavelength channel determines the actual wavelength from the difference divided by the sum separately for each detector pair forming a wavelength channel.

FIG. 3 shows another example of a wavelength detection system 220, comprising a plurality of tunable filters 242, 244, 246 and a single detector 240. The broadband source 234 couples optical energy through splitter 238 as before, and the plurality of sensors reflect this energy using gratings 224, 226, through 228. The reflected energy is directed through splitter 238 to a plurality of tunable filters 246, 244, 242 to detector 240. The tunable filters are controlled by signals 254, 252, 250 respectively, and the null point of the detector response to a tuned filter resolves the wavelength of the returned optical energy, which translates into the strain or temperature of an individual grating.

FIG. 4 shows the control voltages 280, 282, and 284 applied to the tunable filters 242, 244, 246. Each filter is swept in succession using ramp voltages 280, 282, 284, and the corresponding null points 292, 294, 296 determine the wavelengths of the associated gratings 224, 226, 228.

In the measurement system 100 of FIG. 1, or 220 of FIG. 3, the cost of the measurement system tends to be much larger than the cost of the fiber and serial gratings attached to them. Further, while it may be inexpensive to add each additional sensor grating to the measurement system, each sensor grating requires a corresponding wavelength discriminator comprising a wavelength separator port and complementary detectors for the system of FIG. 1. In each of these systems, the number of sensor gratings is matched by the number of wavelength resolution systems, either the detector pairs 160, 162 of FIG. 1, or the tunable filters 242 of FIG. 3.

SUMMARY OF THE INVENTION

A first plurality n of gratings is applied to an optical fiber, forming a sensor segment. A series sensor is formed from a second plurality of such sensor segments such that if there are n gratings per sensor segment, and there are m series sensor segments, this results in m*n measurement gratings in the entire series sensor. A periodic optical signal of short duration is applied to the series sensor, and a measurement system performs a characterization cycle to determine how many pluralities of said grating fibers are present according to return time for the last reflection, which corresponds to a repetition time. Thereafter, optical pulses of this short duration are transmitted to the series sensor at a repetition period. Each sensor reflects a particular wavelength for the illumination interval, and the reflected light from each sensor is measured and converted to a wavelength using a complementary pair of detectors. Each complementary pair of detectors responds in sequence with n measurements, each measurement corresponding to a particular grating from each of the n sensor segments, and the spatial separation between similar-wavelength sensors is resolved using time delay associated with reflection from the first sensor to the second sensor. Each sensor segment is comprised of a plurality of sensor gratings, each reflecting optical energy within a unique wavelength channel such that each wavelength channel provides wavelength measurement for a sensor grating operating within that channel. The wavelength channel includes a detector for converting measured wavelength response into the measured sensor parameter. By multiplexing a particular wavelength channel and associated detector over a plurality of sensor segments, each sensor segment including no more than one sensor operating in a given wavelength channel, it is possible to have a single wavelength channel perform sensor measurements for the associated sensor on each sensor segment. The multiplexing of a single detector within a particular wavelength channel over a plurality of sensors in different sensor segments is referred to as "channel reuse", or "wavelength reuse". In this manner, the cost of the measurement system is effected only by the cost of the additional sensors, and additional sensor gratings require no additional wavelength channels or associated detectors.

DETAILED DESCRIPTION OF THE INVENTION

Figure 1:
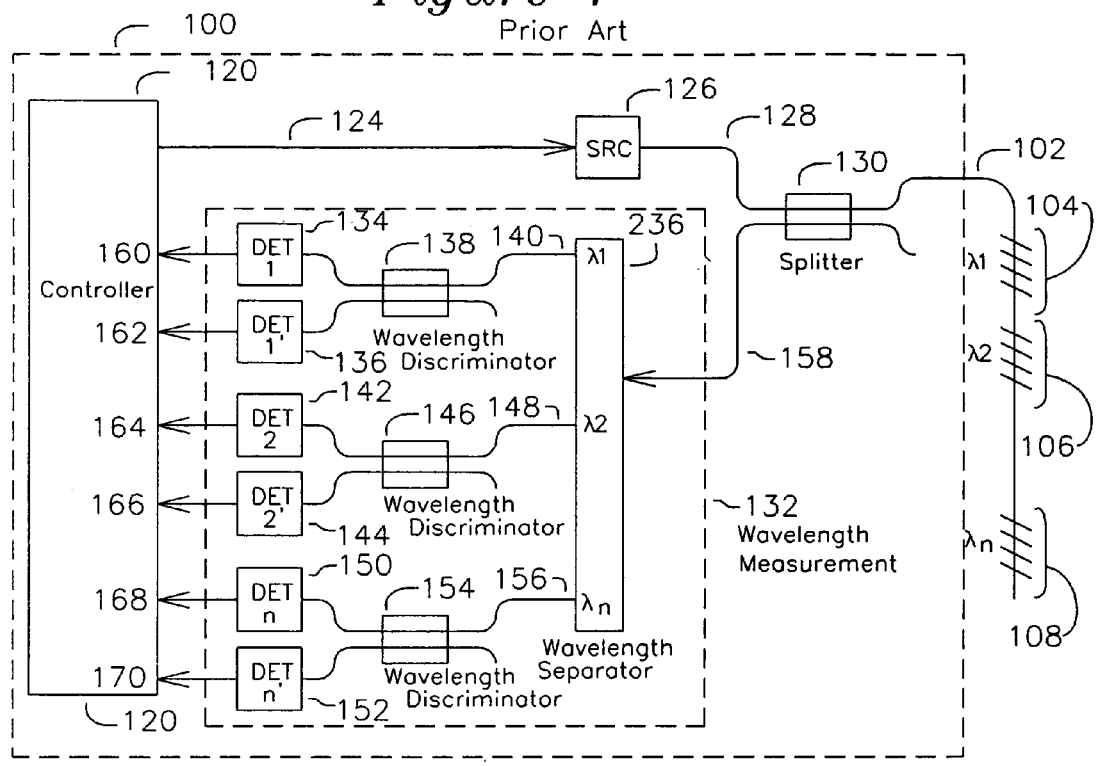
FIG. 1 shows the block diagram for a prior art wavelength measurement system
Figure 2:
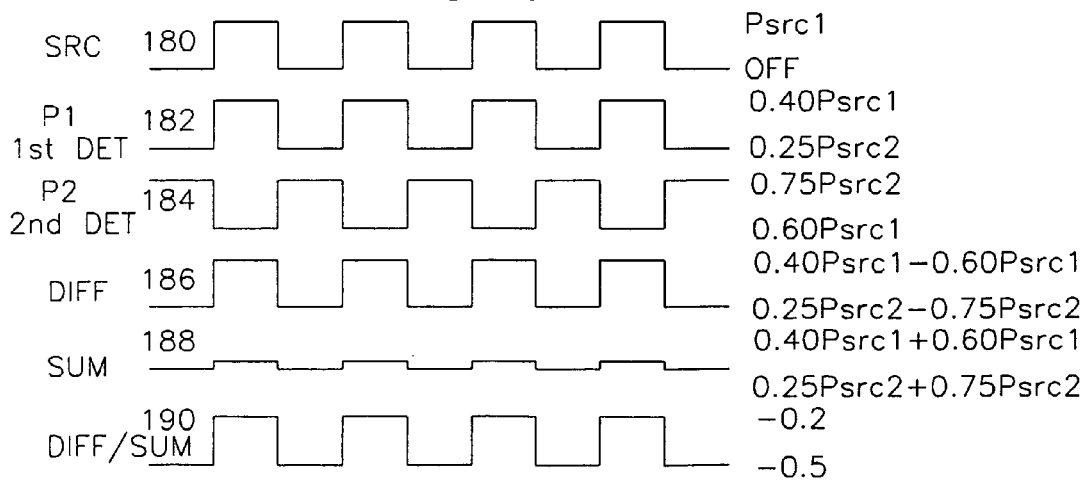
FIG. 2 shows a waveform diagram for the measurement system of FIG. 1.
Figure 3:
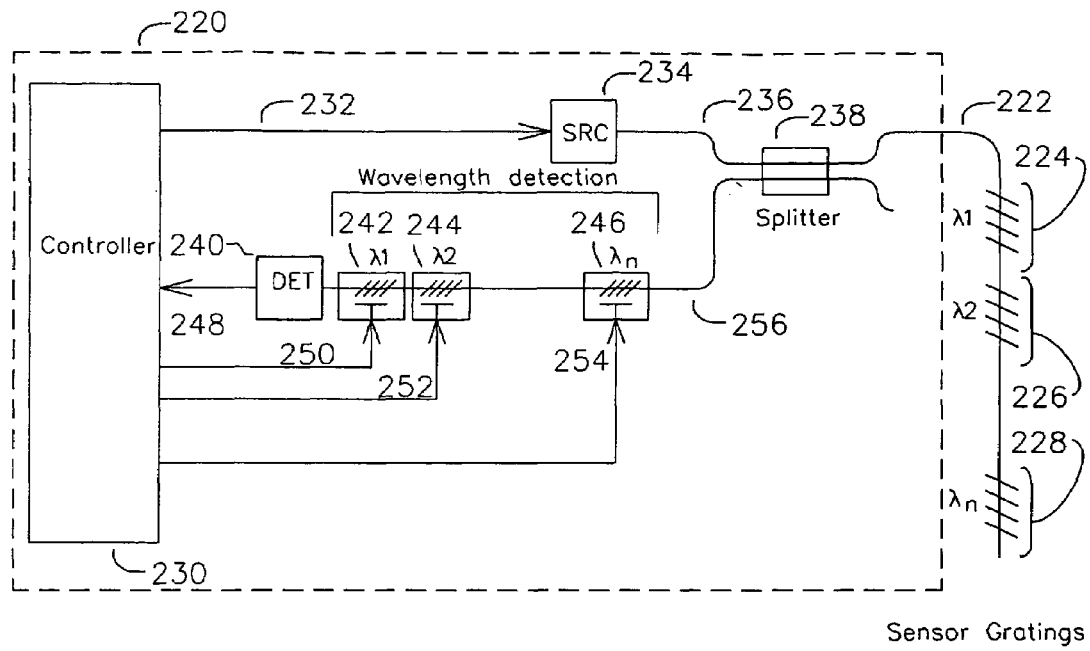
FIG. 3 shows a prior art wavelength measurement system.
Figure 4:
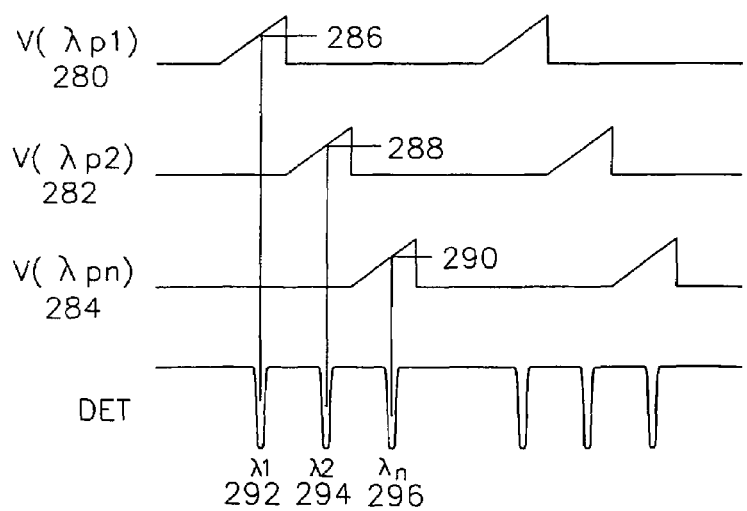
FIG. 4 shows a waveform diagram for the measurement system of FIG. 3.
Figure 5:
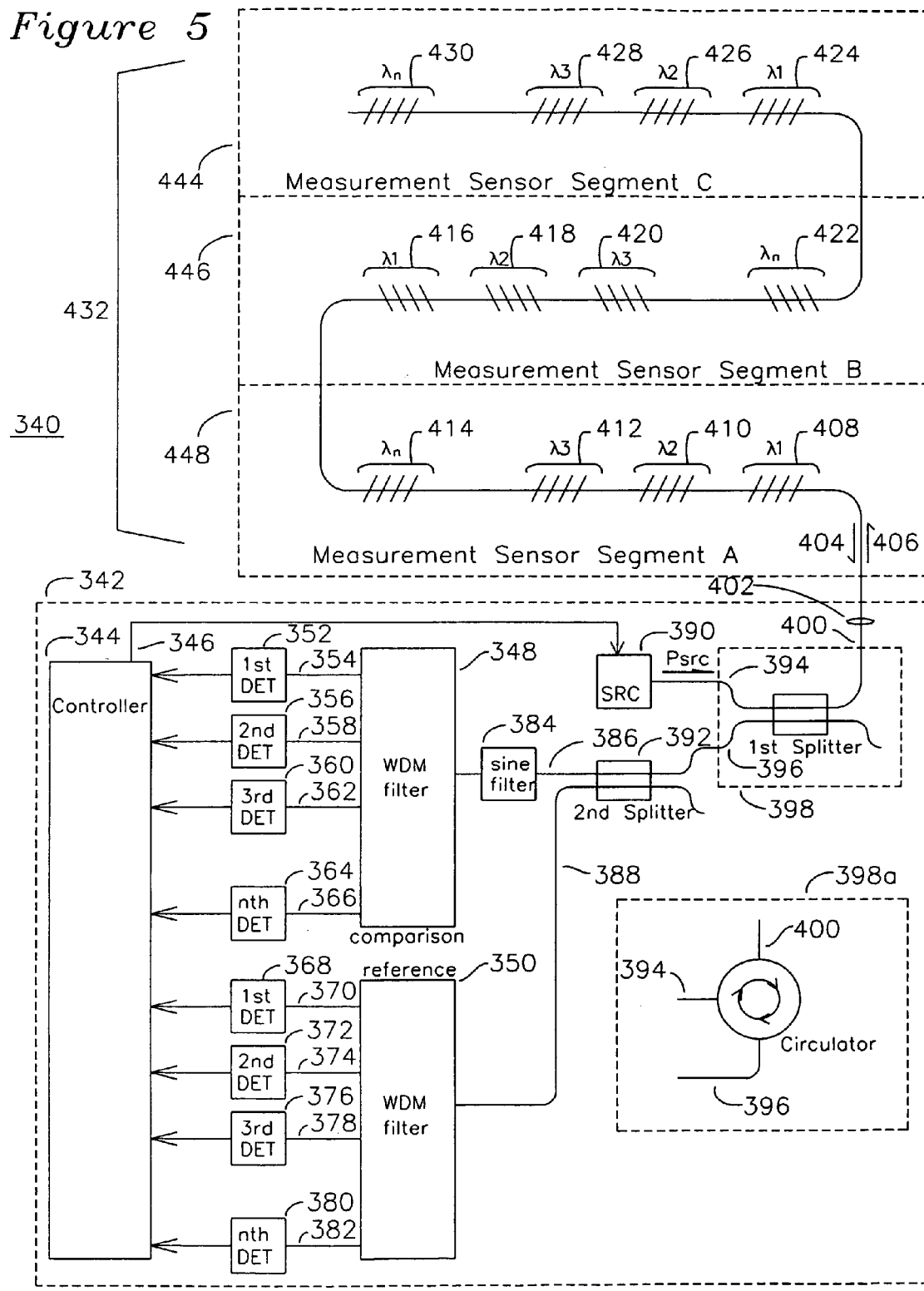
FIG. 5 shows the block diagram for a measurement system for a first plurality of sensor segments, each sensor segment comprising a second plurality of sensor gratings.

FIG. 5 shows a measurement system comprising a series sensor 432 comprising a plurality of sensor segments 444, 446, and 448, and a measurement controller 342. Each sensor segment 444, 446, and 448 comprises a plurality of gratings. Sensor segment 448 has sensor gratings 408, 410, 412, and 414, each at a unique wavelength, and each operating within a defined wavelength channel, such that only one grating within a sensor segment is in a given wavelength channel. Sensor segment 446 includes sensor gratings 416, 418, 420, and 422, each at a unique wavelength, as does sensor segment 444 with sensor gratings 424, 426, 428, and 430. For each sensor segment there may be n gratings present, each operating at a unique wavelength channel, although four are shown for illustration. The sensor segments are placed in a series one-port circuit such that optical energy enters as shown at 406, and is reflected by the gratings of the series sensor and returns as shown at 404. In the prior art described in FIG. 1, a pulsed source is used to measure the dark leakage current of the optical detectors, which may be used to average out and remove this offset. For a detector system of n gratings, it is a requirement of the prior art system that each grating operate in its own wavelength channel, such that each grating operates independently of the other gratings. In the present system, each grating within a sensor segment 444, 446, 448 must be within a unique wavelength channel, however each sensor segment of the series sensor may each have one grating which is within a given wavelength channel, such that any wavelength channel may have m sensor gratings operating within it.

FIG. 5 also shows the block diagram for a sensor measurement system 340, comprising a series sensor 432, and measurement system 342, which adds provision for wavelength channel reuse. FIG. 5 is best understood in combination with FIGS. 6a, 6b, 6c, 6d, and 6e, which show the wavelength specific behavior of the system. For FIGS. 6a through 6d, the x-axis wavelength range is the same for all figures for ease of understanding. Series sensor 432 comprises a plurality of sensor segments 448, 446, and 444, each sensor segment having n gratings which operate in predefined wavelength channels. Each sensor segment having n gratings is equal to the number of measurement channels in the measurement system 342. Each sensor segment 444, 446, 448 comprises a plurality n gratings applied to a single fiber, each grating reflecting incoming optical energy at a unique wavelength which defines a wavelength channel, and the wavelength ranges of each grating are chosen such that a single grating operates within a wavelength channel, and no two wavelength channels overlap each other. Wavelength channels are shown in FIGS. 6a, 6b, 6c, and 6d as 501, 503, 505, and 507, centered about λ1, λ2, λ3, and λn, respectively, and are common to FIGS. 6a–6d. As can be seen, each grating is operating within its own wavelength channel, and no two gratings within a single sensor segment are ever reflecting wave energy at the same wavelength. Sensor gratings 408, 410, 412, and 414 are shown as the 4 gratings at wavelengths λ1, λ2, λ3, and λn, respectively in the first sensor segment 448, and correspond to sensor gratings 416, 418, 420, 422 of sensor segment 446, and sensor gratings 424, 426, 428, and 430 of sensor segment 444, respectively. The number of gratings could be as small as one or two, and as large as the number of wavelength channels which can be supported in the system, and could be greater than many thousands. As an example of wavelength resolution, where sensor gratings 408 and 410 are operating in adjacent wavelength channels 501 and 503, respectively, the highest wavelength reflected by sensor grating 408 and the lowest wavelength reflected by 410 would be unique and distinguishable, as they are operating in separate wavelength channels. The other gratings which are operating in the same wavelength channels are in different sensor segments, such that sensor gratings 408, 416, and 424 may be in wavelength channel 501, while sensor gratings 410, 418, 426 are in wavelength channel 503, etc.

Figure 6A:
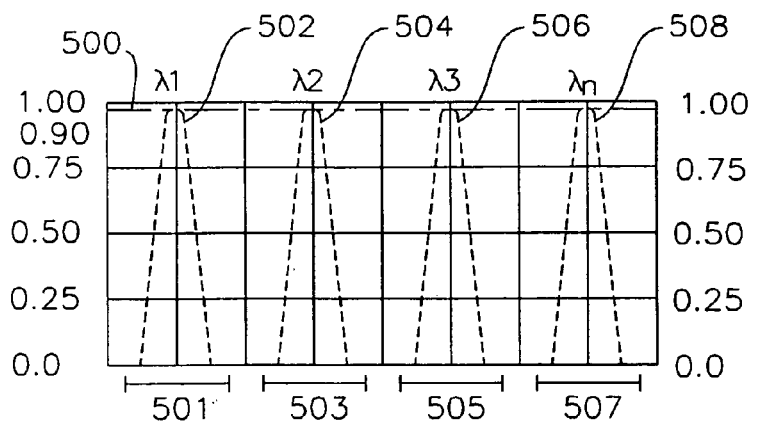
FIGS. 6a, 6b, 6c, 6d and 6e shows a waveform diagram for the measurement system of FIG. 5.
Figure 6B:
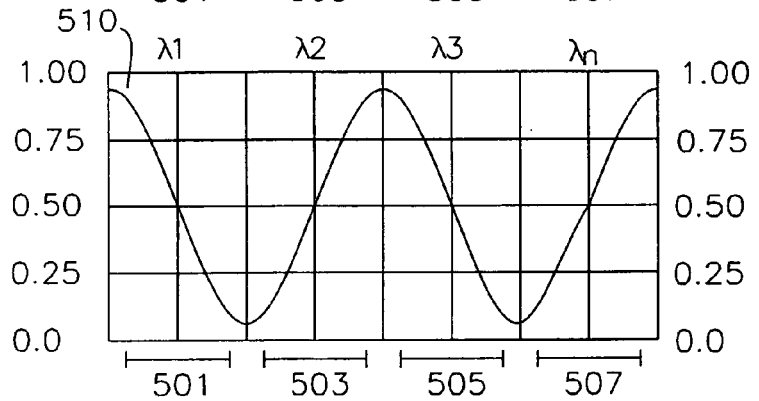

Measurement system 342 includes a broadband optical source 390 which has optical output which covers all wavelength channels 501, 503, 505, 507 of the sensor gratings 408, 416, 424 of channel 501, sensors 410, 420, 426 of wavelength channel 503, etc. The broadband nature of this source 390 is shown as the curve 500 of FIG. 6a. In the best mode of the invention, the source 390 has an amplitude which is independent of wavelength, although a source having a wavelength-dependant amplitude could also be used. The number of sensors supported in a single sensor segment 448, 446, 444 is determined by the number of wavelength channels and the wavelength bandwidth of each channel. Hence the source 390 must provide optical energy of sufficient bandwidth to cover all of these channels, although the variation of optical output versus wavelength within a single channel need not be carefully controlled, as will be seen. Broadband optical energy leaving source 390 travels to a first splitter device 398, which provides optical energy 406 to the series sensor assembly 432. First splitter device 398 is shown as an optical splitter, although other devices such as circulators may be used. Narrowband optical energy 404 reflected by each sensor is then delivered back to first splitter 398 and second splitter 392, where it divides into a reference path 388 and a comparison path 386. In the best mode, the two paths 388 and 386 represent evenly divided optical energy from the output 396 of first splitter 398, however it is possible to accommodate splitter distributions other than 50:50, such as 60:40, etc. Sine filter 394 is coupled on path 386 to the comparison output of second splitter 392, and the sine filter 384 has the characteristic of operating over each wavelength channel, producing an output which is either minimal or maximal at one end of the wavelength channel and maximal or minimal, respectively, at the other range of the wavelength channel. Each half cycle of the sine function reverses and repeats for each wavelength channel over the entire range of operation of the measurement system. Curve 510 of FIG. 6b shows the transfer function of the sine filter, which has an output amplitude which varies with wavelength. The transfer function behavior is periodic over two adjacent wavelength channels. There are two WDM (wavelength division multiplex) filters 348 and 350, which in the best mode have identical filtering characteristics, where this filtering characteristic is to provide coarse separation of wavelength output based on wavelength channel. There are as many outputs for each WDM filter 348 and 350 as there are n wavelength channels in each individual sensor segment 444, 446, or 448. FIG. 5 also shows circulator 398a, which may be used in place of first splitter device 398. Optical energy entering port 394, as from source 390, is coupled to series sensor 432 via port 400, and reflected energy from series sensor 432 enters circulator 398a port 400 and is sent to second splitter 392. In this manner, circulator 398a may be used as first splitter device 398. Alternatively, first splitter 398 may be a 50% power splitter as known to one skilled in the art. A depolarizer 402 may be placed in series with the first splitter sensor port to reduce any maintenance of source 390 polarization along the fiber of the series sensor 432, which would tend to make mechanical changes of the fiber translate into the artifact of different grating response because of polarization dependent modes. Certain sources are intrinsically polarized and require a depolarizer to remove polarization dependent modes, while other sources such as Amplified Spontaneous Emissions (ASE) sources such as irbium doped pumped laser sources generate intrinsically unpolarized optical output and do not require such depolarization.

Figure 6C:
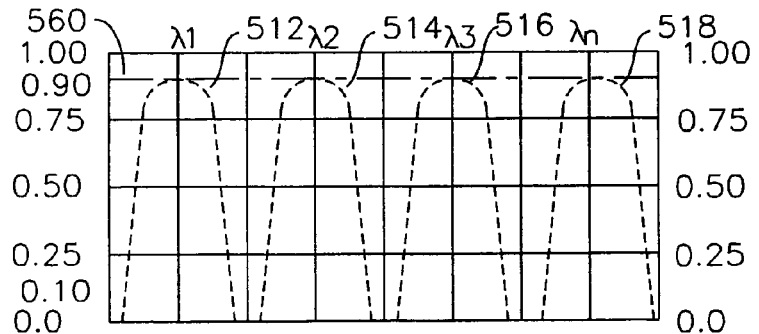

FIG. 6c shows the transfer function for each WDM filter. For illustration and in understanding the operation of the WDM filter, when a broadband source is applied to the WDM filter input, such as source 390, each output produces output wavelengths specific to a particular wavelength channel. For example, outputs 354 and 370 of FIG. 5 could filter and provide exclusively wavelength channel 1 optical response of sensor gratings 408, 416, or 424. Since WDM filter 350 is acting only on optical energy without the effect of the sine filter 384, it provides a reference output constant with wavelength, while the comparison WDM filter 348 provides an output which includes the effect of the sine filter 384 and varies with wavelength. Outputs 358 and 374 would exclusively provide the wavelength channel 2 optical response of sensor gratings 410, 418, and 426, and analogous behavior would be shown by the other channels. Each comparison and reference WDM filter has an output associated with a particular wavelength channel, and each WDM filter output is coupled to an optical detector, which converts an optical input to an electrical output. Each such reference and comparison detector forms a detector pair operating within each wavelength channel. A controller 344 is coupled to each detector electrical output, and reads the detector outputs in pairs. In the example system of FIG. 5, wavelength channel one pair responsive to sensor gratings 408, 416, and 424 could be reference detector 368 and comparison detector 352. Other reference and comparison detector pairs for sensor gratings 410, 418, 426 are 356 and 372. In this manner, each wavelength channel is distinct from the others, and each wavelength channel supports a plurality of sensors, where each wavelength channel corresponds to one of the sensors in each sensor segment, and a plurality of sensor segments are placed in series to form a series sensor.

Figure 6D:
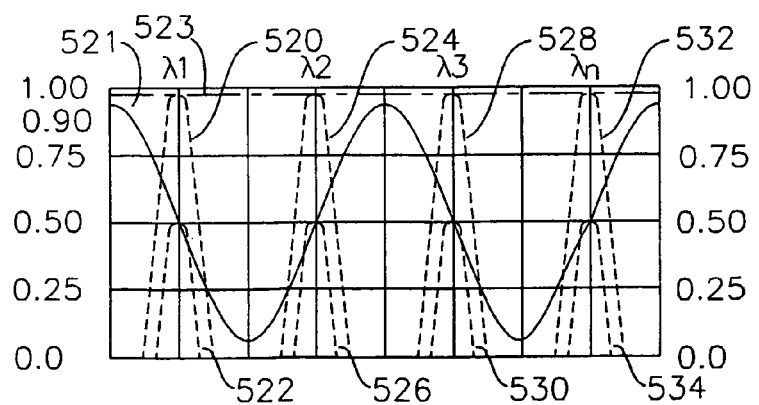

FIG. 6d shows the optical energy provided to each WDM filter, and the outputs produced by each detector. Reflected optical energy 404 has been transferred through first splitter 398 to second splitter 392, and is divided evenly between sine filter 384, which provides filtered optical energy to comparison WDM filter 348 and reference WDM filter 350. First reference detector 368 receives reference optical energy 370, which represents energy reflected by sensor gratings 408, 416, 424 in different times. The responses of each grating are separated by a time-of-flight separation, as will be described later. The sine filter transfer function of sine filter 384 is shown as curve 521 of FIG. 6d. Comparison detector 352 receives filtered optical energy, shown by curve 522. As was described in earlier figures, the ratio of power between comparison detector 352 exposed to optical power 522 and reference detector 368 exposed to optical power 520 forms a monotonically varying factor which may be used to formulate a mathematical relationship between wavelength and desired measurement parameter such as temperature, strain, or any other measurement suitable for a grating-based sensor. This translation between detector power ratio and measurement value may be done in controller 344 using a best-fit curve, or a look-up table, or any other method known to one skilled in the art. Curve 6d also shows wavelength channel 503 responding to sensor gratings 410, 418, 426 and having reference detector response 524 with comparison detector response 526, wavelength channel 505 responding to sensor gratings 412, 420, 428 and having reference detector response 528 and comparison detector response 530, and wavelength channel 507 responding to sensor gratings 414, 422, 430 and having reference detector response 532 and comparison detector response 534.

Figure 6E:
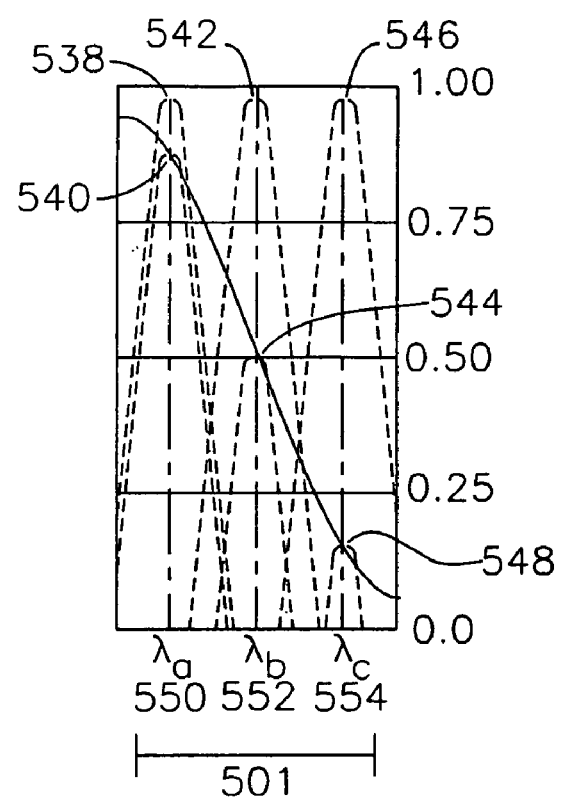

FIG. 6e shows the operation of any single sensor grating such as 408, 416, 424 from each of the sensor segments 444, 446, 448 operating in wavelength channel 501. For the purpose of understanding wavelength detection and resolution, we will consider only one reflected wavelength from one of the sensor gratings in the wavelength channel, such as sensor grating 408. At the center of the range 552, there is a wavelength $\lambda b$ reflected by one of the sensor gratings 408, where the reference detector 368 provides an output based on response to 542 from the reference WDM filter 350, and comparison detector 352 provides an output based on response to 544 from the comparison WDM filter 348. As the detectors have a linear response, the ratio of comparison detector 352 output to reference detector 368 output is roughly 0.5 for wavelength $\lambda b$. When the sensed parameter (such as temperature) causes elongation of sensor grating 408, the sensor grating period increases, thereby increasing the sensor grating wavelength of reflection to 554$\lambda c$, and producing reference detector input 546 and comparison detector input 548, which produces a ratio of comparison detector to reference detector of roughly 0.125 for $\lambda c$. When the sensed parameter reduces the length of sensor grating 408, the sensor grating period decreases, thereby reducing the wavelength of response to 550 $\lambda a$, and producing reference detector input 538 and comparison detector input 540, which produces a ratio of comparison detector to reference detector of roughly 0.85 for $\lambda a$. In this manner, the ratio of comparison detector to reference detector is computed, forming a monotonically increasing or decreasing relationship between ratio and, for example, sensor strain or temperature, and this relationship is used to produce either a temperature or a strain for the associated sensor. Each sensor on a sensor segment 444, 446, or 448 operates in its own wavelength channel, and on a plurality of sensor segments 444 446, and 448, there is one sensor from each sensor segment operating in its own wavelength channel, distinguishable from the others by its time of response. It is also possible for at least one sensor to be used for measuring a temperature, or for at least one sensor to be used for measuring a strain, or any combination of measurements which are suitable for grating-based sensors.

Figure 7A:
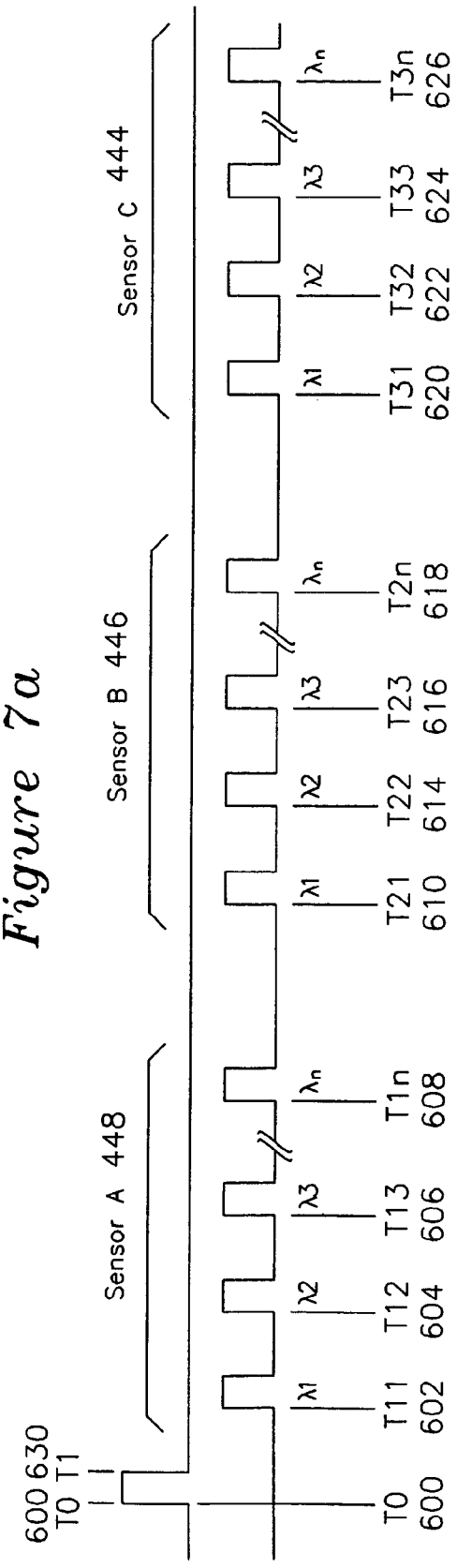
FIGS. 7a and 7b show the control signal for the optical source.

FIG. 7a shows the operation of source 390 of FIG. 5, which is gated on during the interval T0 600 to T1 630. The duration of time from the moment source 390 turns on to the time the wavelength reflected from first sensor grating 408 occurs and is returned to detectors 352 and 368 of FIG. 5 is T11 602. Each grating returns optical energy at its wavelength of response λ1 through λn, as shown in reflections at time T11 602, T12 604. T13 606, through T1n 608, all of which are reflections from first sensor segment 448. Optical energy continues to second sensor segment 446, producing responses for λ1 through λn of second sensor segment 446 at time T21 610, T22 614, T23 616, and T2n 618. This process continues for sensor segment C 444, returning responses for λ1 through λn at T31 620, T32 622, T33 624, through T3n 626. While there are only 3 sensor segments shown, there may be as many as m sensor segments, only limited by the transmitted power of source 390 of FIG. 5 and the optical attenuation of return optical energy and detection noise threshold of detectors 352, etc.

The first time a series sensor is applied to the measurement system 342, the system is not aware of how many sensor segments 444, 446, 448 comprise the series sensor 432. While three sensor segments are shown, the number could potentially be many thousands of sensors. In order for wavelength resolution to be achieved properly, it is essential that the last reflection from the last sensor in the string return prior to sending the next optical excitation pulse.

There are several types of calibration which may be performed on the sensor system. One type of calibration is known as a "factory calibration", which involves the characterization of the sine filter 384 of FIG. 5, and other components of the measurement system 342 related to converting optical energy at a particular wavelength into the desired sensor measurement, such as temperature or strain. Another type of calibration is known as a "field calibration", which includes normalizations such as the measurement of dark current offsets from the detectors, and "configuration characterization", which involves characterizing what sensors are attached to the system, such as the number of sensor segments, and the number of sensors in each sensor segment.

FIG. 7a shows a calibration sequence of the configuration characterization type, during which the system sends a single pulse, and awaits response from every sensor prior to sending another optical pulse. After the duration of time for which the last optical response may be seen, the system uses this time duration for subsequent transmission, shown as time T0 612 to Tp 634, representing the periodic optical pulse associated with measuring m strings of sensors, each having n gratings. One means for characterizing the series sensor is sending a single pulse and counting the responses from each sensor, noting the sequential progression through wavelength channels λ1 through λn, cycling through until all sensors have responded. The wavelengths λ1 through λn need not be sequential in wavelength, but only unique. Additionally, it is possible to use the last wavelength on each sensor segment as an identifier for the end of that measurement chain. Any of the wavelength channels could be used for this purpose, such that the measurement system could use a response from this wavelength channel to indicate the last response, which would also assist in identifying the last channel or either the sensor segment (for identical sensor segments), or the series sensor (when the last measurement sensor of the chain is unique). It is also possible to form other types of identifying gratings at the end of the sensor segment or series sensor. For example, a broadband or chirp grating which could provide a type of response used by the system for detecting the marker could be used in conjunction with a matching grating inside the measurement system used for the purpose of detecting this grating, or it could be measured by the complementary detector system, or it could be an ordinary grating used in a dual purpose for making measurements. In this manner any of several types of identifier gratings could be applied to the series sensor or sensor segments which form the series sensor. It is also possible to use this calibration sequence to perform steps of a "field calibration" and to characterize the offset voltages and currents of the detectors 352, 356, 360, 364, 368, 372, 376, 380 of FIG. 5, using the same technique as was performed during the intervals the source 126 of the prior art was turned off.

Figure 7B:
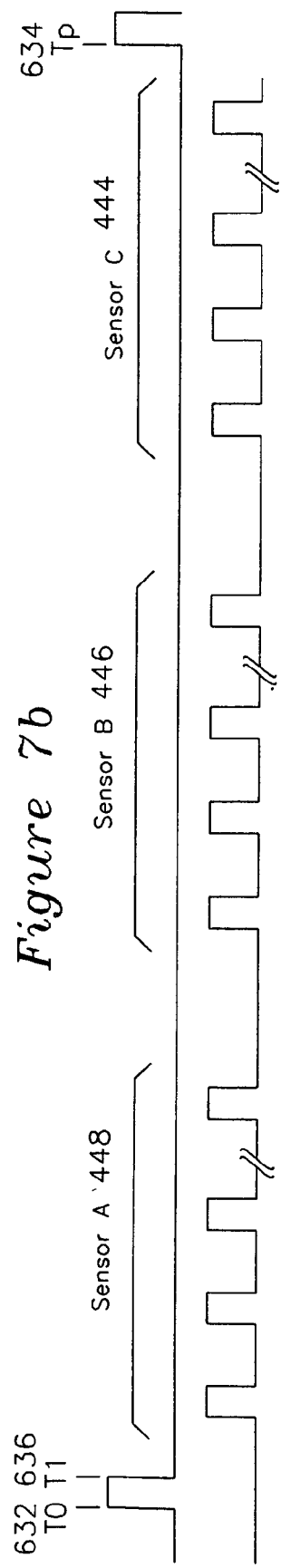

While FIG. 7b shows minimal length optical pulses, it is clear to one skilled in the art of detector design that maximally long detection periods produce superior signal to noise ratio. It is desired to maximize the signal to noise ratio in the measurement system by optimizing the on-time of the optical source 390 of FIG. 5, as opposed to the minimal on-time T0 632 to T1 636 shown in FIG. 7b.

Figure 8:
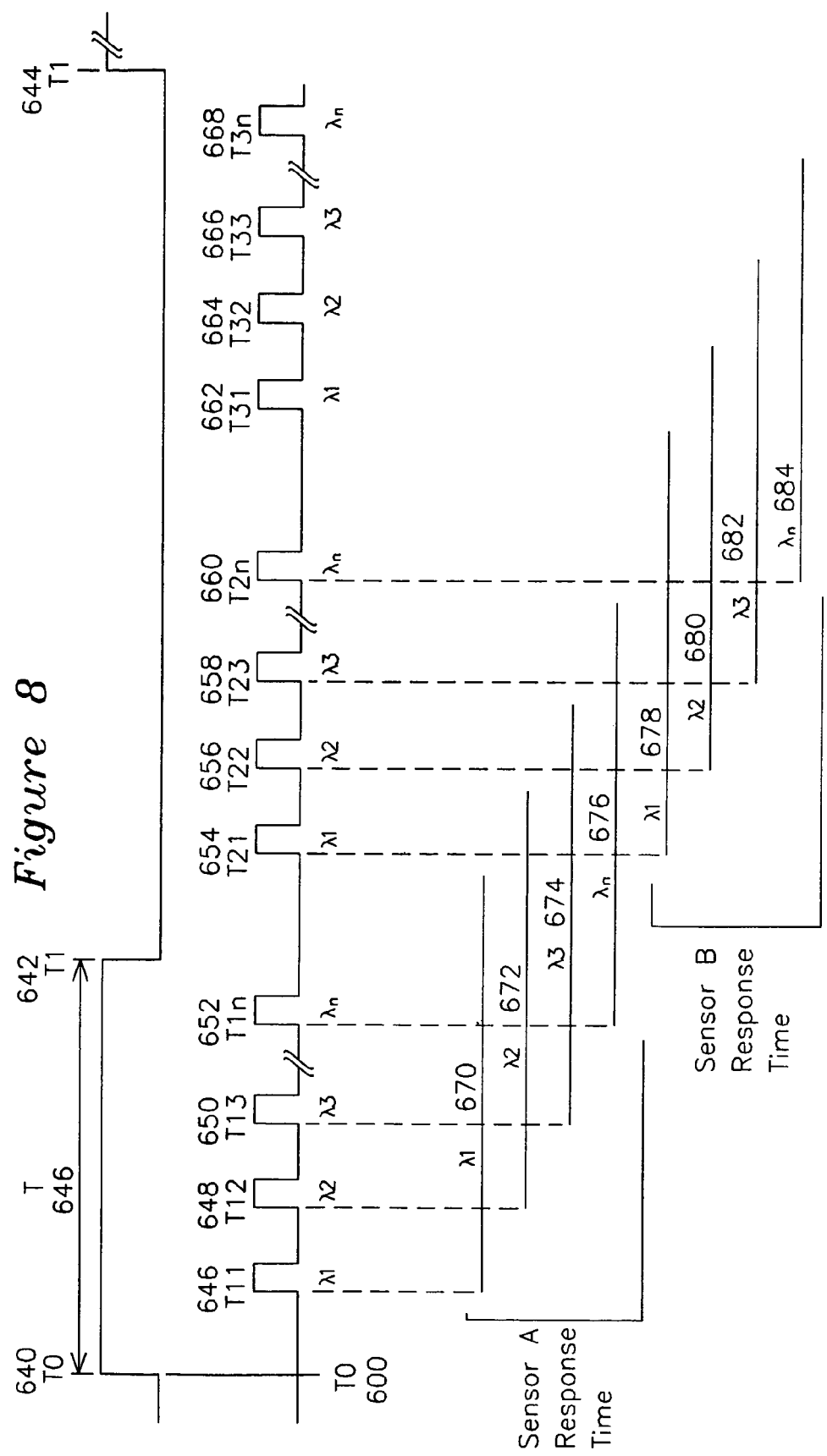
FIG. 8 shows the control signal for the optical source and duration of response for the wavelength channels.

FIG. 8 shows a maximal length optical pulse active from T0 640 to T1 642, and having a pulse duration T 646, and a measurement repetition time from T0 640 to T1 644. The response from each grating has response time T, and if the gratings are arranged in sequential order such that each grating response λ1 through λn, and the response time from any two gratings operating in the same wavelength channel is less than T 646, the measurement system is assured of providing a response for each grating in a separate manner. Each sensor grating in succession 408, 410, 412, 414, 416, 418, 420, and 422 of FIG. 5 produces an optical reflection from broadband source 390, which has been gated on for time 646. Sensor grating 408 produces response 670, grating 410 produces response 672, sensor grating 412 produces response 674, continuing through sensor grating 422 producing response 684, and other sensor gratings and responses not shown through the last sensor grating of the system. Since each sensor grating is responding to an optical excitation of duration 646, each response 670, 672, 674, 676, 678, 680, 682 is of the same duration as excitation 646. Each of the gratings reflects optical energy at its characteristic wavelength, in its respective wavelength channel. The duration of optical excitation 646 is limited by the maximum time for which only one sensor in a single wavelength channel is responding. For example, during interval 670 when first sensor grating 408 is reflecting energy, sensor gratings 410, 412, and 414 are also responding, as shown by durations 672, 674, and 676. However, each of these other sensor gratings 410, 412, 414 of FIG. 5 and responses 672, 674, and 676, respectively, are operating in unique wavelength channels, and therefore do not interfere with each other, or with first sensor grating 408 measurement. By the time the optical response for sensor grating 408 ends, the optical response for sensor grating 416, which is in the same wavelength channel, is starting. In this manner, the detectors being measured by controller 344 are examining in sequence the outputs of each grating, and only one grating is responding at a time.

While FIG. 8 shows the maximum duration of time for which the excitation pulse may be applied to avoid simultaneous responses from multiple sensors in a single wavelength channel, the optical source 390 of FIG. 5 may also have certain constraints. For the case of an optical source 390 which is an incoherent broadband source, there are few optical length constraints dictated by the source. For the case of a very narrowband coherent source or a sensor grating with very narrowband response, there is often an associated parameter known as coherent length, which defines the propagation distance covered after which the coherent source or reflector loses enough of its coherency to allow addition of reflected energy from different sources without interference effects. One case that may be considered is the reflection of optical energy from multi-path reflections. In such a case, a short multi-path reflection causes energy to appear at the same instant as a longer single-path reflection. As an example, optical energy transmitted through sensor grating 408, reflected by sensor grating 416, reflected again by sensor grating 408, reflected again by sensor grating 416 and returning to the detector would represent a relatively low power level compared to energy on a single reflection from sensor grating 424. If the former multi-path optical energy were to return at the same time as the latter single-path optical energy, and this duration was within a coherent length, there could be coherent interference between the two signals, which would cause the detector to read erroneous results. If the two signals summed in an optical length which was longer than the coherent length, no such interference would occur, and it would simply be a case of a weak signal adding to a strong signal, and would cause negligible measurement error. If the source is coherent and has a coherent length, the requirement would be for two grating operating at a single wavelength channel to be separated by at least half the coherent length of the source.

While the reflected response of each grating is unique in time, with only one grating response appearing in a wavelength channel in any point in time, as shown in FIG. 8, in the case where more than one grating is reflecting at a particular wavelength in different sensors, the possibility exists of "shadowing", where the optical energy returned by a first-encountered grating leaves an insufficient amount of optical energy for the subsequent grating. For example, if sensor grating 408 returned 90% of its optical energy at a particular wavelength λ1 this would not present a problem if sensor grating 416 operating in the same wavelength channel were at a slightly different wavelength for which there were remaining optical energy to reflect. However, if it were operating at the exact same wavelength as sensor grating 408, this would leave only 10% of the original energy to be returned, so if it had the same characteristic as the first sensor grating 408, it would return 9% of the original energy and 1% of the original energy would pass on the the following grating. This cascade power loss problem would limit the number of sensors which could be supported, as the signal level returned to the detectors would be close to the noise floor of the measurement system. One solution would be to reduce the characteristic in-band reflection from 90% to a range of 5%, or any level which would enable the addition of the maximum number of sensors, while allowing each sensor to respond within the dynamic range of the detectors. For the general case where a reflected power level Pd is required at the detector, and a broadband output power Po is generated, and neglecting the optical cable losses, the optical losses of the system should enable the last reflecting sensor in a particular wavelength channel to reflect optical energy sufficiently to be above the power level Pd at the detector. There are three general ways to budget the power loss over the sensors:

a) all sensors have uniform reflectivity in the range of 1–5% in the region of operation. This approach has the advantage that the sensors are identical to each other, or that each sensor string is identical to other sensor strings which may be attached to the series sensor. This method has the advantage of lower manufacturing cost, however the sensors closer to the measurement apparatus have a higher signal to noise ratio than sensors near the end of the series sensor.

b) all sensors have uniform signal to noise ratio, which indicates a tapered reflection response such that sensors close to the measurement apparatus have comparatively low reflection response compared to sensors at the end of the series sensor. This approach has the advantage of maximizing the number of sensors which may be attached to the system.

c) all sensors are high reflectivity (>50%), and the sensors operate in unique, non-overlapping regions such that any sensor in any sensor segment can not shadow, or operate in the same identical wavelength, as any other sensor. This produces a system with a smaller number of sensors, since a given wavelength channel must be divided into unique regions where each of the sensors from each sensor segment will operate. This results in a smaller number of sensors in the total system, however each sensor has a maximum signal to noise ratio.

An example of the implementation of system b) above could be realized where in FIG. 5, the last grating for a first wavelength would be sensor grating 424. For uniform reflection coefficient, and assuming a worst case scenario of all prior first wavelength sensor gratings 416 and 408 operating at the same wavelength, or "shadowing" this wavelength, for a transmission loss of Lt db for each preceding sensor grating 416 and 408, and a reflection loss of Lr db for the last sensor grating 424, the total available loss would be analyzed as follows:

Available Path Loss=10 log (Po/Pd)−Lp where Po=output Power;

Pd=detector power;

Lp=Miscellaneous Optical Path Loss for cables and connectors;

While the grating loss through the longest path would be:

Total Grating Loss=(m−1)(Lt+Lr)+Lr where:

Lr is the reflection loss for a single grating;

Lt is the transmission loss through a single grating;

m is the number of gratings operating in the same wavelength channel.

In this manner, an optical sensor system incorporating reuse of measurement channels may be formed using n wavelength detectors which each operate in one of n wavelength channels, each channel being reused m times, representing the number of sensor segments, each sensor segment having one sensor which operates uniquely in one of the measurement channels. It is also possible to form an identifier grating into one of the wavelength channels, and to use this identifier grating for an indication of either the end of an individual sensor segment, or the end of the series sensor. The examples shown are intended to enable understanding of the invention, and do not limit the invention to only the examples shown herein.

We claim:

1. A fiber-optic sensor system comprising:

an optical fiber having a plurality n of sensor gratings applied sequentially to said fiber, said fiber and sensor gratings forming a sensor segment, said sensor segment having a first end and a second end, each said sensor grating operating within a unique wavelength channel;

a series sensor formed from a plurality m of said sensor segments, each said sensor segment having a said first end of one sensor coupled to said second end of another said sensor segment forming a series string having an bi-directional end and an unused end;

a pulsed source of broadband optical energy applied to said series sensor bi-directional end, said energy reflecting back to said series sensor bi-directional end, being removed, and applied to a wavelength measurement system where a plurality of said sensor gratings provide a plurality of optical responses with only one response per said wavelength channel, where said pulsed source of broadband energy is limited in duration such that each sensor responds in a unique said wavelength channel.

2. The measurement system of claim 1 where said sensor segment can detect said plurality n of simultaneous wavelength channels.

3. The measurement system of claim 1 where said wavelength measurement system comprises:
   said broadband optical source coupled to a first splitter, said first splitter having a sensor port, a measurement port, and a source port coupled to said broadband source, said first splitter coupling optical power from said broadband source to said series sensor bi-directional end, and coupling optical power from said series sensor bi-directional end to said measurement port;
   a second splitter having an input port, a comparison port, and a reference port, optical power applied to said input port splitting between said comparison port and said reference port, said second splitter input port coupled to said first splitter measurement port;
   a sine filter having an input port and an output port, the transfer function of said sine filter being an attenuation function which varies periodically over a range of wavelengths, said sine filter coupled to said second splitter comparison port;
   a reference WDM filter and a comparison WDM filter, each said WDM filter having an input port and a plurality said n of output ports, each said output port responsive to a wavelength associated with each said n sensor, said comparison WDM filter input coupled to said sine filter output, and said reference WDM filter input coupled to said second splitter reference port;
   a plurality said n of detector pairs, each said detector pair coupled to said reference WDM filter output port and said comparison WDM filter output port and providing a reference output and comparison output for each said sensor;
   a controller coupled to each said n plurality of detector pairs, converting a reference output and comparison output into an associated sensor measurement for each said n plurality of detector pairs.

4. The measurement system of claim 3 where said measurement system said first coupler is an optical circulator.

5. The measurement system of claim 1 where one of said sensor gratings is an identifier grating indicating a position on said sensor segment.

6. The measurement system of claim 5 where said identifier grating is positioned at the end of said sensor segment.

7. The measurement system of claim 1 where the number of sensor gratings on each said sensor segment is said n.

8. The measurement system of claim 1 where said broadband optical source said pulse duration is less than the time required for the leading edge of optical energy from said broadband source to pass through one of said sensor segments.

9. The measurement system of claim 1 where said broadband optical source said duration is less than the time required for the leading edge of optical energy from said broadband source to pass through the shortest of said sensor segments forming said series sensor.

10. The measurement system of claim 1 where said controller has provision for simultaneously detecting said n wavelength channels, and said sensor segment has up to n sensor gratings.

11. The measurement system of claim 1 where said controller has provision for simultaneously detecting said n wavelength channels, with no more than one said wavelength channel providing a response at any given time.

12. The measurement system of claim 1 where said broadband optical source sends a characterization pulse to determine the number of sensor segments in the sensor string.

13. The measurement system of claim 1 where after said characterization pulse is sent and said number of sensor segments is determined, said broadband pulse is sent with a duration less than the optical length of one said sensor segment, and a repetition period greater than the optical length of the entire said series sensor.

14. The measurement system of claim 1 where said characterization pulse includes an interval where no optical energy is being sent by any source or reflected by any said sensor.

15. The measurement system of claim 14 where said interval where no optical energy is sent or reflected is used to perform a detector offset calibration.

16. The measurement system of claim 1 where said broadband source is a coherent source having a coherent distance, and any two said sensors in a single said measurement channel are separated by a distance greater than half said coherent distance.

17. The measurement system of claim 1 where said plurality of sensor gratings includes at least one sensor grating with a reflectivity in the range 1% to 5%, and no greater than one said sensor grating in each said sensor segment is operating in said wavelength channel.

18. The measurement system of claim 1 where said plurality of sensor gratings includes at least two sensor segments having gratings operating within a given said wavelength channel, and said sensor gratings optical responses are exclusive within the same wavelength within said wavelength channel over a measurement range.

19. The measurement system of claim 1 where said plurality of sensor gratings have substantially uniform reflectivity.

20. The measurement system of claim 1 where said plurality of sensor gratings have reflectivities which result in uniform signal to noise ratio for each said sensor grating as measured at said series sensor bi-directional end.

21. A fiber-optic sensor system comprising:
   a series sensor, said series sensor comprising m sensor segments, each of said m sensor segments comprising a plurality n of sensor gratings applied to a single fiber, said series sensor having a single port, said series sensor port returning optical energy in a wavelength unique to each said n sensor grating when optical energy is applied to said single port;
   a sensor controller comprising:
   a broadband optical source coupled to a first splitter device, said first splitter device having a sensor port, a measurement port, and a source port coupled to said broadband source, said first splitter device coupling optical power from said broadband source to said sensor port, and coupling optical power from said sensor port to said measurement port;
   a second splitter having an input port, a comparison port, and a reference port, optical power applied to said input port splitting between said comparison port and said reference port, said second splitter input port coupled to said first splitter device measurement port;
   a sine filter having an input port and an output port, the transfer function of said sine filter being an attenuation function which varies periodically over a range of wavelengths, said sine filter coupled to said second splitter comparison port;

a reference WDM filter and a comparison WDM filter, each said WDM filter having an input port and a plurality said n of output ports, each said output port responsive to a wavelength associated with each said n sensor, said comparison WDM filter input coupled to said sine filter output, and said reference WDM filter input coupled to said second splitter reference port;

a plurality said n of detector pairs, each said detector pair coupled to said reference WDM filter output port and said comparison WDM filter output port and providing a reference output and comparison output for each said sensor;

a controller coupled to each said n plurality of detector pairs, converting a reference output and comparison output into an associated sensor measurement for each said n plurality of detector pairs:

where said broadband optical source is providing optical energy for a duration less than the optical length of one of said sensor segments.

22. The fiber-optic sensor system of claim 21 where said first splitter device is an optical splitter having a pair of first ports and a pair of second ports, optical energy coupled to either of said splitter first ports dividing evenly into said pair of second ports, and energy coupled to either of said splitter second ports dividing evenly between said splitter first ports.

23. The fiber-optic sensor system of claim 21 where said first splitter device is an optical circulator having said source port, said sensor port, and said measurement port, said source port coupling energy to said sensor port, and energy applied to said sensor port coupled to said measurement port.

24. The fiber-optic sensor system of claim 22 or 23 where the optical energy removed from at least one of said second ports is at least 3 db lower than the optical energy applied to said first port.

25. The fiber-optic sensor system of claim 22 or 23 where the optical energy removed from at least one of said first ports is at least 3 db lower than the optical energy applied to said second port.

26. The fiber-optic sensor system of claim 22 or 23 where said first splitter is an optical circulator having a first port for the introduction of optical energy, a second port for the introduction of optical energy, said second port also removing optical energy applied to said first port, and a third port for removal of optical energy applied to said second port.

27. The fiber-optic sensor system of claim 22 or 23 where the optical path loss from said first port to said second port is less than 3 db.

28. The fiber-optic sensor system of claim 22 or 23 where the optical path loss from said second port to said third port is less than 3 db.

29. A method for measuring a plurality of sensor gratings formed on a single optical fiber where each said sensor grating is operating uniquely within one of n wavelength channels, the number of wavelength channels of said fiber being from 2 to n, such that there are at least two said sensor gratings operating within one of said wavelength channels, said plurality of sensor gratings having a bi-directional end and an unused end, said method having two steps:

a first step of characterizing said plurality of sensor gratings by sending a single optical pulse to said bi-directional end and counting the return optical signals from each said m sensor grating until no further signals are detected, thereby determining said m;

a second step of applying a chain of optical pulses to said bi-directional end, each said optical pulse having a duration which is shorter than the time required for said optical signal to propagate from a sensor in one said wavelength channel to the next sensor in the same said wavelength channel, thereby determining in succession the wavelengths of each sensor in each said wavelength channel.

30. The method of claim 29 where said second step includes converting said measured wavelengths into a strain or a temperature.

31. The method of claim 29 where said second step said chain of optical pulses are separated by an interval of time determined from said first step.

32. The method of claim 29 where said second step includes measuring said n wavelength channels simultaneously.

33. The method of claim 29 where said second step includes said chain of optical pulses is separated by a time interval which is derived from said first step.

34. The method of claim 29 where said chain of optical pulses is separated by a time interval which is greater than the time required for the last said sensor to respond to said optical pulse.

35. The method of claim 29 where said chain of optical pulses has a uniform period.

36. The method of claim 29 where said first step includes determining the number n of wavelength channels in use by any said sensor grating.

37. The method of claim 29 where at least one said sensor grating is measuring a temperature.

38. The method of claim 29 where at least one said sensor grating is measuring a strain.

* * * * *